US 10,046,845 B2

(12) United States Patent
Dazet et al.

(10) Patent No.: US 10,046,845 B2
(45) Date of Patent: Aug. 14, 2018

(54) FLEXIBLE CONNECTION BETWEEN THE FLOOR STRUCTURE AND THE HULL STRUCTURE OF AN AIRCRAFT

(71) Applicant: Airbus Operations (S.A.S.), Toulouse (FR)

(72) Inventors: Francis Dazet, Tournous Darre (FR); Jérome Antypas, Plaisance du Touch (FR); Laurent Bel, Gagnac sur Garonne (FR); Philippe Delorme, Plaisance-du-Touch (FR); Raphaël Brisbart, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 199 days.

(21) Appl. No.: 14/725,551

(22) Filed: May 29, 2015

(65) Prior Publication Data
US 2015/0344120 A1 Dec. 3, 2015

(30) Foreign Application Priority Data
May 30, 2014 (FR) ...................................... 14 54914

(51) Int. Cl.
*B64C 1/18* (2006.01)
*B64C 1/06* (2006.01)
(Continued)

(52) U.S. Cl.
CPC .............. *B64C 1/069* (2013.01); *B64C 1/062* (2013.01); *B64C 1/18* (2013.01); *F16G 11/06* (2013.01); *F16G 11/12* (2013.01)

(58) Field of Classification Search
CPC .. B64C 1/069; B64C 1/18; B64C 1/32; B64C 1/22; B64C 1/20; B63B 3/48; B63B 2003/485; B63B 3/142; B64D 11/00
See application file for complete search history.

(56) References Cited

U.S. PATENT DOCUMENTS 2,263,919 A * 11/1941 Darragh, Jr. ............ B64C 1/066
181/207
4,479,621 A 10/1984 Bergholz
(Continued)

FOREIGN PATENT DOCUMENTS

DE 31 41 869 A1 5/1983
EP 0 212 826 A1 3/1987
(Continued)

OTHER PUBLICATIONS

French Search Report for Application No. 14 54 914 dated Jan. 20, 2015.

*Primary Examiner* — Brian M O'Hara
(74) *Attorney, Agent, or Firm* — Jenkins, Wilson, Taylor & Hunt, P.A.

(57) ABSTRACT

The disclosure herein relates to a part of an aircraft structure including a portion of a floor structure and a portion of a hull structure, connected to one another by a connecting element. In accordance with, the disclosure herein the connecting element includes a flexible cable fixed at one of the ends thereof to the portion of a floor structure and fixed at the other, second of the ends thereof to the portion of a hull structure. When the connection between the portion of a floor structure and the portion of a hull structure is subjected to tensile load, the flexible cable makes it possible to meet the standards of resistance to forward accelerations of the aircraft. When the connection is subjected to compressive load, the flexible cable relaxes and bends, which limits the requirements of withstanding compressive stresses and therefore the weight of the connecting element.

17 Claims, 5 Drawing Sheets

(51) Int. Cl.
*F16G 11/06* (2006.01)
*F16G 11/12* (2006.01)

(56) References Cited

U.S. PATENT DOCUMENTS

| | | | | |
|---|---|---|---|---|
| 4,538,663 | A * | 9/1985 | Looker | B65D 90/021 160/368.1 |
| 5,377,556 | A * | 1/1995 | Byrnes | F16G 11/12 74/500.5 |
| 8,074,928 | B2 * | 12/2011 | Haack | B64C 1/18 244/118.5 |
| 8,757,459 | B2 * | 6/2014 | Crawford | B63B 17/00 114/364 |
| 8,857,762 | B2 * | 10/2014 | Kauffman | B64C 1/00 160/9 |
| 9,073,605 | B2 * | 7/2015 | Hall | B63B 17/0081 |
| 2008/0217478 | A1 * | 9/2008 | Keeler | B64C 1/18 244/119 |
| 2009/0236472 | A1 * | 9/2009 | Wood | B64C 1/18 244/119 |
| 2010/0001134 | A1 * | 1/2010 | Braeutigam | B64C 1/068 244/119 |
| 2010/0230535 | A1 * | 9/2010 | Huber | B64C 1/18 244/118.1 |
| 2012/0025023 | A1 * | 2/2012 | Bernard | B64C 1/064 244/131 |
| 2012/0280012 | A1 * | 11/2012 | Crawford | B63B 17/00 224/406 |
| 2013/0092793 | A1 * | 4/2013 | Braeutigam | B64C 1/068 244/131 |
| 2013/0213288 | A1 * | 8/2013 | Hall | B63B 17/0081 114/85 |
| 2014/0131519 | A1 * | 5/2014 | Benthien | F16B 35/06 244/131 |
| 2015/0158558 | A1 * | 6/2015 | Lundin | B63B 25/16 114/256 |
| 2015/0344119 | A1 * | 12/2015 | Dazet | B64C 1/062 244/119 |

FOREIGN PATENT DOCUMENTS

| | | | | |
|---|---|---|---|---|
| GB | | 2169256 A * | 7/1986 | B64C 1/18 |
| WO | WO 2009/098098 A2 | | 8/2008 | |
| WO | WO 2010/004172 A2 | | 1/2010 | |

* cited by examiner

FLEXIBLE CONNECTION BETWEEN THE FLOOR STRUCTURE AND THE HULL STRUCTURE OF AN AIRCRAFT

CROSS-REFERENCE TO RELATED APPLICATION

This application claims priority to FR 14 54914 filed May 30, 2014, the entire disclosure of which is incorporated by reference herein.

TECHNICAL FIELD

The present disclosure relates to the field of the connection between the floor structure and the hull structure in an aircraft.

BACKGROUND

Figure 1:
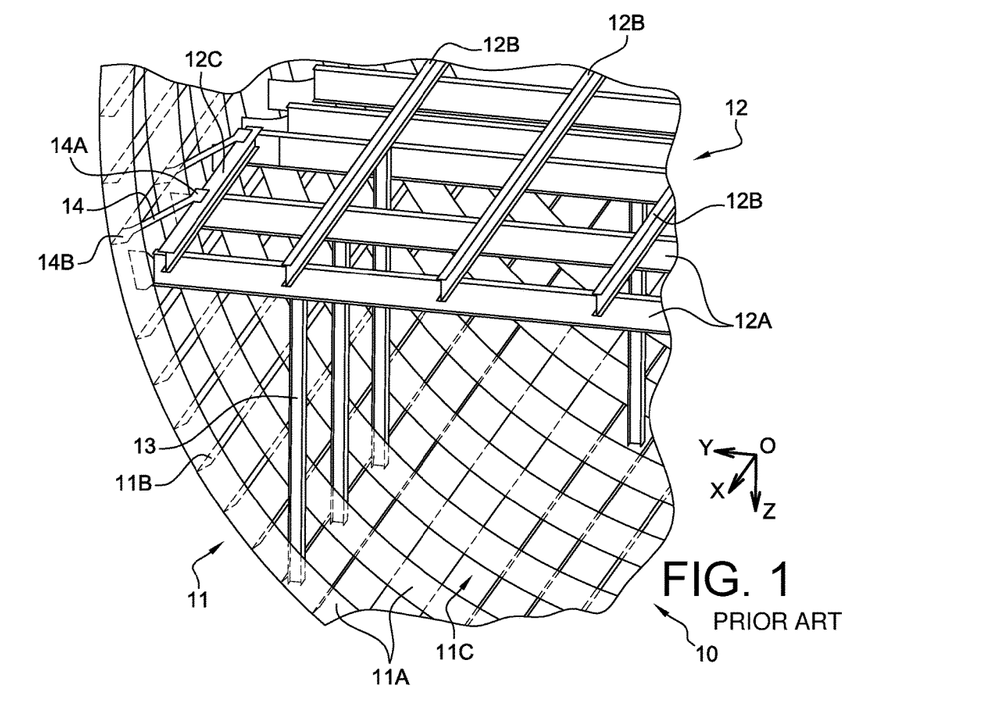
FIG. 1 schematically illustrates part of an aircraft structure in accordance with the prior art.

The structure 10 of an aircraft in particular comprises the hull structure and the floor structure. FIG. 1 illustrates an example of a connection according to the prior art between a hull structure 11 and a floor structure 12.

An orthonormal coordinate system (Oxyz) is defined.

The axis Ox corresponds to the longitudinal axis Ox of the aircraft. The front and the rear of the aircraft are defined along this axis Ox. The front of the aircraft corresponds to the nose side of the aircraft, where the cockpit is located. The rear of the aircraft corresponds to the tail side of the aircraft, where the vertical stabilizer is generally found. Hereinafter it will be considered that under normal flight conditions the aircraft moves along the axis Ox, along a vector oriented from the rear to the front of the aircraft.

The axis Oz corresponds to the vertical axis when the aircraft is located on the ground, in a parking position.

The axis Oy, with the axis Ox, defines a horizontal plane when the aircraft is located on the ground, in a parking position. The axis Oy corresponds to the transverse axis of the aircraft.

The hull structure 11 in particular comprises a set of frames 11A, forming stiffeners which are transverse relative to the axis Ox, and a set of stringers 11B, forming longitudinal stiffeners parallel to the axis Ox. The hull structure also comprises one or more metal or composite sheets shaped in accordance with the desired profile and referred to as the skin 11C. The skin 11C covers the lattice structure formed by the frames 11A and the stringers 11B.

The floor structure 12 comprises an assembly of crosspieces 12A and rails 12B. The rails 12B extend along the axis Ox and serve to fix furniture elements, such as the seats. The rail 12C is an external rail, i.e. a rail close to the hull structure or in other words close to the lateral walls of the aircraft. The crosspieces 12A extend along the axis Oy.

In the example shown in FIG. 1 the floor structure 12 is pressed against the hull structure 11 via the intermediary of stanchions 13 extending along the axis Oz.

In order to stabilize the floor structure 12, anti-crash connecting rods 14 extend in the plane (xOy). Each anti-crash connecting rod is an elongated rigid component, mounted fixedly at each one of its ends, on the floor structure on the one hand and on the hull structure on the other hand. In the example shown in FIG. 1 each anti-crash connecting rod 14 is fixed at a first point 14A to the external rail 12C and at a second point 14B to a stringer 11B. The first point 14A is located close to the intersection between the external rail 12C and a crosspiece 12A. The second point 14B is located close to the intersection between a stringer 11B and a frame 11A. Each anti-crash connecting rod 14 is inclined relative to the axis Ox.

The anti-crash connecting rods 14 make it possible to hold the floor structure 12 substantially fixed relative to the hull structure 11, even in the event of sharp deceleration of the aircraft, and in particular in the event of the aircraft crashing. A crash can be either a crash proper or an abrupt landing of the aircraft, or an impact approximating an abrupt landing in terms of the forces. In such a situation, the inertial force of the floor structure tends to move it away from the hull structure. In particular, the anti-crash connecting rods must be able to withstand an acceleration equal to 9 g along the axis Ox, towards the front of the aircraft (where g is the gravity of earth, equal to approximately 9.8 m·s$^{-2}$). An acceleration towards the front of the aircraft (forward acceleration) may also be called "deceleration". The force which acts on the anti-crash connecting rods is proportional to this deceleration and to the mass of the floor structure and the loads supported by the latter (aircraft furniture, passengers, etc.). In order to withstand such a deceleration, the anti-crash connecting rods have very wide sections and therefore a very considerable mass.

SUMMARY

One objective of the present disclosure is to provide a solution for connecting the floor structure and the hull structure which makes it possible to reduce the total mass of the aircraft, while still fulfilling the requirements of withstanding an acceleration of 9 g towards the front of the aircraft.

This objective is achieved with a part of an aircraft structure comprising a portion of a floor structure and a portion of a hull structure connected to one another by a connecting element.

In accordance with the disclosure herein the connecting element comprises a flexible cable fixed at a first of the ends thereof to the portion of a floor structure and fixed at the other end thereof, the second end, to the portion of a hull structure.

When the connection between the portion of a hull structure and the portion of a floor structure is subject to tensile load (deceleration of the aircraft), the cable gets tensioned and makes it possible to meet the current standards of withstanding an acceleration of 9 g towards the front of the aircraft.

When the connection between the portion of a hull structure and the portion of a floor structure is subject to compressive load (for example lateral bending load), the flexible cable relaxes, and potentially may bend slightly.

Thanks to its properties in terms of flexibility, the connecting element according to the disclosure herein does not need to be strong enough to withstand a compressive load.

On the contrary, in the prior art, the use of a rigid anti-crash connecting rod mounted fixedly on the floor structure and on the hull structure requires this connecting rod to be able to withstand the compressive stresses in order to avoid buckling phenomena (instability of a structure, which, exposed to a compressive force, has a tendency to deflect in a direction perpendicular to the axis of compression).

Thus, the connecting element according to the disclosure herein can have a reduced mass compared with an anti-crash connecting rod according to the prior art.

A connection is thus provided between the floor structure and the hull structure making it possible to reduce the total mass of the aircraft whilst meeting the requirements of withstanding a forward acceleration of the aircraft of 9 g. For example, the mass of the connector for connecting the floor structure and the hull structure is reduced by 20% by using a connecting element according to the disclosure herein in replacement of an anti-crash connecting rod according to the prior art. The total mass saving is approximately 15 kg by use of a connecting element according to the disclosure herein.

It may be considered that the disclosure herein lies in replacing connecting structure, or a connector, having an elevated compressive modulus, for example of approximately 70,000 MPa, by connecting structure having a very low compressive modulus (less than or equal to 100 MPa).

The cable can be fixed to an external rail of the portion of a floor structure.

The cable can be fixed to a frame and a skin of the portion of a hull structure by a coupling part.

The cable preferably has a rigidity less than 1000 N·m$^{-1}$.

The part of a structure according to the disclosure herein advantageously comprises a pre-tensioning device designed to continuously tension the cable.

The pre-tensioning device may comprise:
a first stop element protruding on the cable at one of the ends thereof,
a second stop element, which is mounted fixedly relative to the portion of a floor structure or the portion of a hull structure, and which is provided with an opening, through which the cable extends, and
a compression coil spring mounted concentrically with the cable and disposed between the first stop element and the second stop element, bearing thereagainst.

In a variant the pre-tensioning device may comprise:
a first stop element protruding on the cable at one of the ends thereof,
a second stop element, which is mounted fixedly relative to the portion of a floor structure or the portion of a hull structure, and which is provided with an opening, through which the cable extends, and
a spring washer mounted concentrically with the cable and disposed between the first stop element and the second stop element, bearing thereagainst.

In accordance with another variant the pre-tensioning device may comprise:
a first stop element, screwed around the cable, on a thread of the cable,
a second stop element, which is mounted fixedly relative to the portion of a floor structure or the portion of a hull structure, and which is provided with an opening, through which the cable extends, and
a spacer disposed between the first stop element and the second stop element,
a pre-tensioning force applied to the cable being adjustable by an adjustment of the position of the first stop element on the thread of the cable.

The pre-tensioning device preferably applies to the cable a pre-tensioning force between 1050 N and 1150 N.

Different approaches for fixing an end of the cable to one from the portion of a hull structure and the portion of a floor structure will now be described.

In accordance with an advantageous embodiment, an end of the cable is inserted into an opening formed in an intermediate part fixed to one from the portion of a hull structure and the portion of a floor structure, the cable being secured to the intermediate part by two nuts positioned around the cable on either side of the opening.

For example:
a first end of the cable is inserted into an opening formed in a first intermediate part fixed to the portion of a hull structure, the cable being secured to the first intermediate part by two nuts positioned around the cable on either side of the opening; and
the other end of the cable is inserted into an opening formed in a second intermediate part fixed to the portion of a hull structure, the cable being secured to the second intermediate part by two nuts positioned around the cable on either side of the opening.

In accordance with a variant of this advantageous embodiment, an end of the cable is placed against the base of an indentation in an intermediate part, by a clip extending transversely to the cable end, the clip being fixed on either side of the cable to one from the portion of a hull structure and the portion of a floor structure.

In accordance with another variant of this advantageous embodiment, an end of the cable is placed against an inner face of an orifice formed in an intermediate part, by a clip extending transversely to the cable, the clip being fixed on one single side of the cable to one from the portion of a hull structure and the portion of a floor structure.

The two ends of the cable can be fixed, one to the portion of a hull structure and the other to the portion of a floor structure, by the same fixing structure from the three variants described above. In a variant, the two ends of the cable can be fixed, one to the portion of a hull structure and the other to the portion of a floor structure, by different fixing structure from the three variants described above.

BRIEF DESCRIPTION OF THE DRAWINGS

The present disclosure will be better understood upon reading the description of exemplary embodiments provided purely by way of non-limiting indication and with reference to the accompanying drawings, in which.

DETAILED DESCRIPTION

Figure 2:
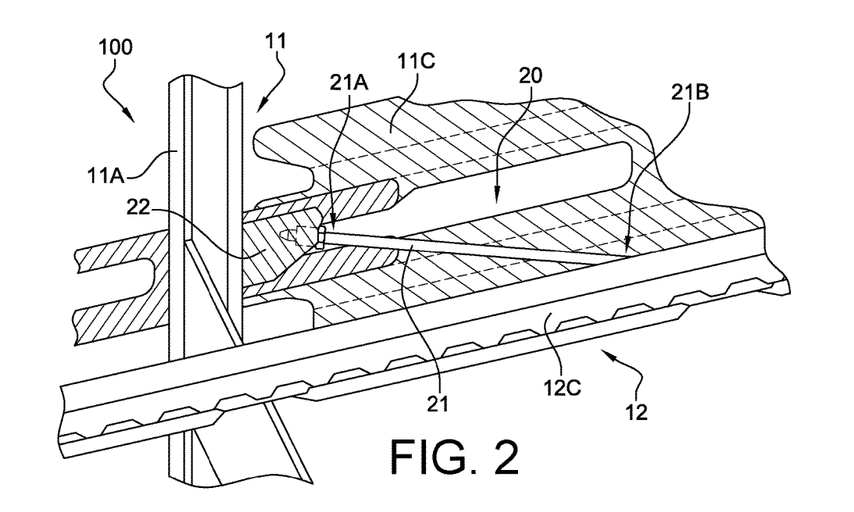
FIG. 2 illustrates a first embodiment of part of an aircraft structure according to the disclosure herein.

FIG. 2 illustrates a first embodiment of part of an aircraft structure 100 according to the disclosure herein.

FIG. 2 shows a portion of a floor structure 12, i.e. a part of a floor structure. FIG. 2 in particular illustrates a detailed view of an external rail 12C of the floor structure 12. FIG. 2 also shows a portion of a hull structure 11, i.e. a part of a hull structure. FIG. 2 in particular illustrates a detailed view of a frame 11A and of a skin 11C. A connecting element 20 according to the disclosure herein connects the portion of a floor structure and the portion of a hull structure.

The connecting element 20 is formed of a flexible cable 21, also referred to as a guy rope, and of, as the case may be, intermediate fixing elements, such as the coupling parts described hereinafter.

The cable 21 is fixed, on the side of the first end 21A thereof, to the portion of a hull structure 11. In other words, the first end 21A of the cable is fixed relative to the hull structure. In particular, the end 21A of the cable 21 is fixed with the aid of a coupling part 22, both to the frame 11A and to the skin 11C. In a variant the end 21A of the cable is fixed, with the aid of the coupling part 22, both to the frame 11A and to a stringer.

The coupling part 22 for example comprises a recess, in which the end 21A of the cable is mounted fixedly, and through-holes for the passage of rivets in order to fix the coupling part to the hull structure. The coupling part 22 is sometimes referred to as an "interface fitting". Different examples of a coupling part will be described further below, with reference to FIGS. 4A to 4C.

The cable 21 is fixed, on the side of the second end thereof 21B, to the portion of a floor structure 12. In the example shown in FIG. 2 the second end 21B of the cable is fixed to the external rail 12C, in the vicinity of a crosspiece (not shown). In a variant, the second end 21B of the cable is fixed both to the external rail 12C and to the crosspiece. Here again, a coupling part (not shown) is advantageously used to provide the interface between the second end 21B of the cable and, here, the floor structure 12.

The term "flexible cable" means that the cable has a low flexural rigidity. The flexural rigidity of the cable corresponds to the ratio between a force applied to the cable and the resultant deflection of the cable. The force applied to the cable is directed along an axis orthogonal to the longitudinal axis of the cable. The force is applied to the middle of the cable, as considered in the direction of length thereof. The resultant deflection is the displacement of a point located in the middle of the cable. A low flexural rigidity signifies that a reduced compressive force allows a high deflection of the cable. The flexural rigidity, denoted k, can be expressed thus:

$$k \propto \frac{E \cdot I}{L^3}$$

with L the length of the cable, E the modulus of elasticity under tension of the cable, and I the inertia under flexion of the cable. The rigidity of the cable 21 is particularly less than 1000 N·m$^{-1}$, or even less than 500 N·m$^{-1}$, or even less than 100 N·m$^{-1}$.

The cable 21 can be made of metal, for example of aluminium, of titanium or of steel. Steel has an advantageous ratio between its ultimate tensile strength and its density, of approximately 0.15. Stainless steel is advantageously used, in particular for its resistance to corrosion. In a variant the cable 21 is made of a composite material, for example comprising carbon fibres or poly(p-phenylene terephthalamide) fibres (KEVLAR®).

The cable advantageously has a cylindrical form. The diameter of the cable may be between 6 mm and 15 mm, for example 8 mm, 10 mm or 12 mm. The length of the cable may be between 400 mm and 600 mm, for example 470 mm.

The cable 21 extends in the plane (y0x) as defined in the introduction. Nevertheless, a component along the axis Oz could be envisaged.

The cable 21 is placed at an angle relative to the axis Ox and Oy, for example at an angle between 20° and 80° relative to the axis Ox. This angle is less than 90°.

In other words, the flexible cable and the floor structure are connected together solely at one of the ends of the flexible cable, and the flexible cable and the hull structure are connected together solely at the other of the ends of the flexible cable.

In particular, the flexible cable extends along an axis connecting the floor structure and the hull structure, this axis having at least one component along the longitudinal axis of the aircraft, and one component along the transverse axis of the aircraft. It can be the that this axis is oriented at an angle relative to the longitudinal axis of the aircraft.

In other words, the flexible cable extends in a straight line between the floor structure and the hull structure, this straight line having at least one component along the longitudinal axis of the aircraft, and one component along the transverse axis of the aircraft. In particular, this straight line is located in the plane formed by the longitudinal and transverse axis Ox and Oy.

Such an arrangement makes it possible to absorb loads parallel to the longitudinal axis of the aircraft.

For example, the end of the cable connected to the hull structure is located towards the front of the aircraft, whereas the end of the cable connected to the floor structure is located towards the rear of the aircraft. In other words, the end of the cable connected to the hull structure is located in front of the end of the cable connected to the floor structure, along the longitudinal axis.

Figure 3A:
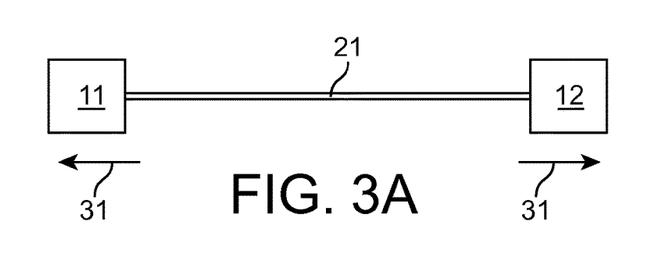
FIGS. 3A and 3B schematically illustrate the principle of the connecting element according to the disclosure herein.
Figure 3B:
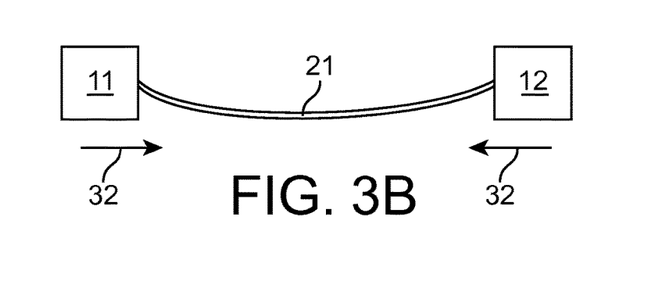

FIGS. 3A and 3B illustrate, schematically, the principle of the connecting element according to the disclosure herein.

In FIG. 3A the connection between the hull structure and the floor structure is tensioned, in particular along the longitudinal axis of the aircraft (see arrows 31). In other words, the floor structure 12 tends to pull away from the hull structure 11 (crash situation, for example). The cable tenses. Under these conditions the cable satisfies the criterion of resistance to a forward acceleration of the aircraft of 9 g. In particular, the cable 21 is dimensioned so as to avoid rupture when subjected to such conditions. This condition is met in particular by a suitable choice of the diameter of the cable. The cable is dimensioned so that, under normal conditions of use (tensioning less than 9 g towards the front of the aircraft), the stresses experienced do not lead to permanent deformation. In other words, under normal conditions of use, any potential deformation of the cable is an elastic deformation.

FIG. 3B Illustrates the case in which the connection between the hull structure and the floor structure is subjected to compressive load, in particular along the longitudinal axis of the aircraft (see arrows 32). In other words, the floor structure 12 tends to move towards the hull structure 11. In this case the cable is simply relaxed. Thanks to the flexural properties of the cable 21, there is no risk of bowing, as could be the case with a rigid part, such as an anti-crash connecting rod according to the prior art. The connecting element according to the disclosure herein thus offers a simple and effective solution so that the connection between the hull structure and the floor structure can withstand compressive loads, whilst offering a reduced mass.

The disclosure herein presents a high simplicity of installation and maintenance, the parts being easily accessible and there being no need for cumbersome adjustments or specific tooling.

It is also noted that the connections used, between the cable and the floor structure and between the cable and the hull structure, have no degree of freedom. There are thus no potential difficulties associated with the existence of at least one degree of freedom, for example an increase in the wear of the mechanical parts.

Figure 4A:
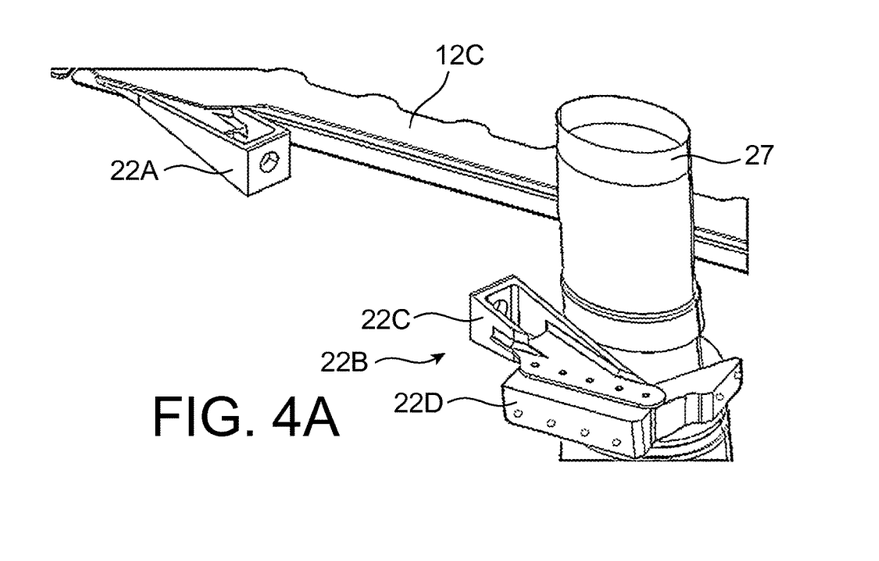
FIG. 4A illustrates a detail of a second embodiment of part of an aircraft structure according to the disclosure herein.

FIG. 4A illustrates a detail of a second embodiment of a part of an aircraft structure according to the disclosure herein. FIG. 4A shows:
- a first coupling part 22A, making it possible to fix a first end of the cable (not shown) to the portion of a floor structure, in particular to the rail 12C; and
- a second coupling part 22B, making it possible to fix a second end of the cable (not shown) to the portion of a hull structure (not shown).

The second coupling part 22B consists here of two basic parts:
- a first basic part 22C, similar to the first coupling part 22A and receiving the second end of the cable; and
- a second basic part 22D, fixed directly to the hull structure and to the first basic part 22C by rivets. The second basic part 22D is fixed in particular both the to the frame 11A and to the skin 11C and makes it possible to avoid an obstacle, such as a conduit 27.

Figure 4B:
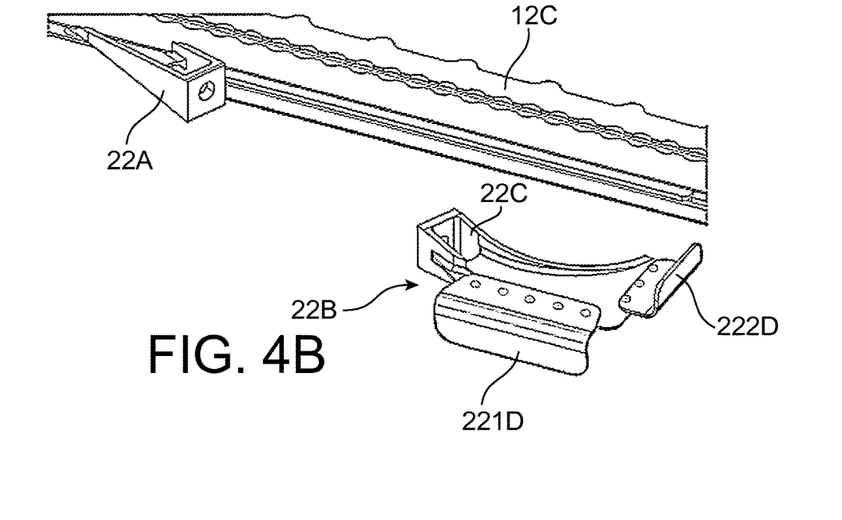
FIG. 4B illustrates a variant of the embodiment of FIG. 4A.

In accordance with a variant illustrated in FIG. 4B, the second coupling part 22B consists here of three basic parts:
- a first basic part 22C, similar to the first coupling part 22A and receiving the second end of the cable;
- a second basic part 221D, fixed directly to one from the frame 11A and the skin 11C, and to the first basic part 22C; and
- a third basic part 222D, fixed directly to the other from the frame 11A and the skin 11C, and to the first basic part 22C.

Figure 4C:
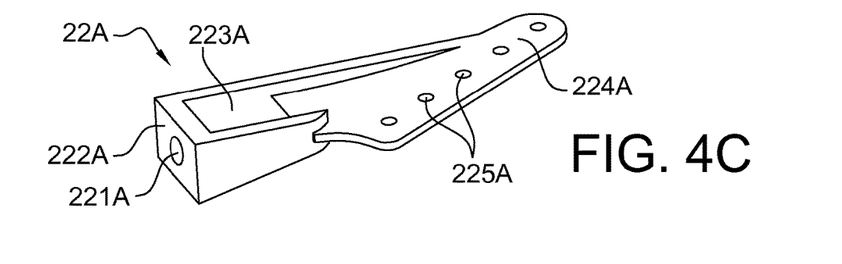
FIG. 4C illustrates a coupling part according to the disclosure herein for fixing a cable end to the floor structure or the hull structure.

FIG. 4C illustrates a detailed view of the first coupling part 22A illustrated in FIGS. 4A and 4B.

The first coupling part 22A is shown in a perspective view. It comprises an opening 221A, through which the first end of the cable is inserted. The diameter of the opening 221A is slightly greater than the diameter of the cable. The opening is formed in a wall 222A of the first coupling part 22A. The wall 222A is preferably orthogonal to the longitudinal axis of the cable, when this is tensed.

Figure 4D:
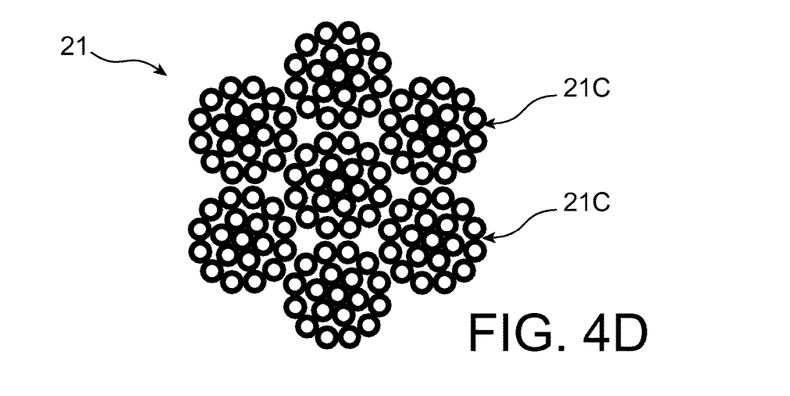
FIG. 4D illustrates a cable according to the disclosure herein in sectional view.
Figure 4E:
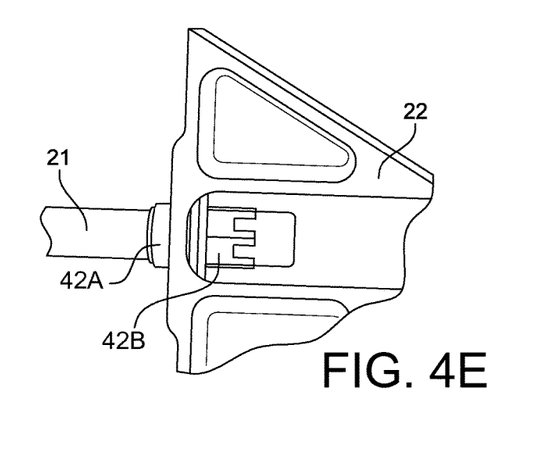
FIGS. 4E to 4G illustrate different variants for fixing a cable according to the disclosure herein.

The first coupling part 22A also comprises a recess 223A, within which the first end of the cable is housed, as well as a fixing element for fixing the cable to the first coupling part (see FIG. 4E).

The recess 223A for example has inner walls having three faces, these walls together having a U-shaped section. In particular, the wall 222A receiving the opening is surrounded by two lateral walls parallel to one another. This U shape makes it possible to easily insert the fixing element in the recess 223A when assembling a connecting element according to disclosure herein. After having inserted the fixing element in the recess 223A, the first end of the cable is introduced into the recess by sliding the end of the cable into the opening 221A. The fixing element is then fixed to the cable, as explained with reference to FIG. 4E.

The first coupling part 22A also comprises a planar support part 224A, able to be pressed against a planar surface and fixed to this planar surface by rivets mounted in the through-holes 225A.

FIG. 4D illustrates a sectional view of a cable 21 according to the disclosure herein. The cable 21 is formed of a primary stranded wire formed by an assembly of a number of secondary stranded wires 21C twisted together. The example shown in FIG. 4D has six secondary stranded wires 21C. Each secondary stranded wire 21C is a stranded wire formed by an assembly of wires twisted together, for example steel wires.

Figure 4F:
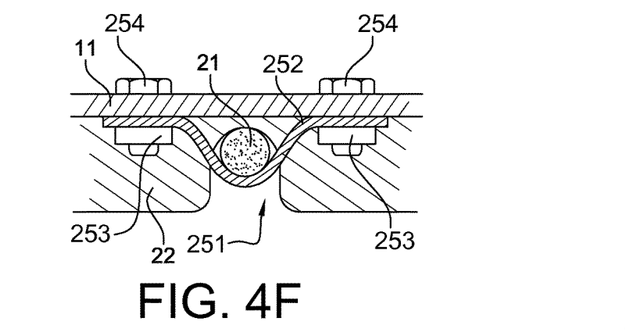
Figure 4G:
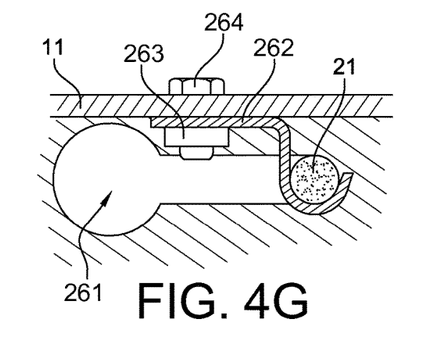

FIGS. 4E to 4G illustrate different variants for fixing a cable according to the disclosure herein.

FIG. 4E illustrates a detailed view of the embodiment illustrated in FIG. 2 and also makes it possible to illustrate the fixing of an end of the cable in a coupling part as shown in FIGS. 4A to 4C.

The cable 21 is inserted into an opening formed in the coupling part 22. Two nuts 42A and 42B are positioned on either side of the opening and are screwed on respective threads of the end of the cable. The threads are formed for example in a local excess thickness of the cable. The nuts 42A and 42B have diameters greater than the diameter of the opening, such that the end of the cable and the coupling part are clamped together between the two nuts and thus fixed to one another. The nut 42B can be located in a recess in the coupling part. It forms a fixing element as mentioned with reference to FIG. 4C.

FIGS. 4F and 4G illustrate two variants for fixing a cable end. These two variants involve a coupling part. The cable end fixed to the hull structure 11 has been shown by way of example.

FIGS. 4F and 4G are sectional views in a plane orthogonal to the longitudinal axis of the cable, when the cable is tensed.

In the variant shown in FIG. 4F, the coupling part 22 comprises an indentation 251, against the base of which the end of the cable presses. The base of the indentation 251 extends along an axis parallel to the plane of the hull structure 11, against which the coupling part 22 bears. The axis of the depth of the indentation 251 extends along an axis orthogonal to the plane of the hull structure 11, against which the coupling part 22 bears. The end of the cable is placed against the base of the indentation by a clip 252, which extends over part of the lateral face of the cable, such that the cable is secured between this clip and the base of the indentation. The clip 252 is fixed to the hull structure 11, on either side of the cable, by two nuts 253 and two screws 254.

In the variant shown in FIG. 4G, the intermediate part comprises an aperture or orifice 261. In the sectional view of FIG. 4G, the aperture 261 is of elongate form in a direction orthogonal to the longitudinal axis of the tensed cable, and parallel to the plane of the hull structure 11, against which the coupling part 22 bears. The end of the cable is inserted into the aperture 261 at a wide part of this aperture. This cable end is then moved in translation in the aperture, in the direction of elongation thereof, in order to reach a narrowed portion of the aperture. The end of the cable is pressed against the base of this narrowed portion of the aperture 261. A clip 262 holds the end of the cable pressed against the base of this narrowed portion of the aperture 261. The end of the cable is in contact, over more than half of the perimeter thereof, with the base of this narrowed portion of the aperture 261. The clip 262 has a first planar portion, bearing against the hull structure 11. A second planar portion, inclined at 90° relative to the first planar portion, extends towards the cable and passes adjacently to the cable. A third portion of the clip surrounds the cable, on the side opposite the hull structure 11. The clip 262 is fixed to the hull structure 11 by a screw 264 and a nut 263.

A person skilled in the art will be able to conceive numerous other variants for fixing a cable end, without departing from the scope of the present disclosure.

The cable 21 is advantageously subjected to a pre-tensioning force.

The total tensile force applied to the cable is then equal to the pre-tensioning force, to which a tensile force (positive) or compressive force (negative) is added, corresponding to the load of the connection between the floor structure and the hull structure, caused by the accelerations or decelerations of the aircraft.

The pre-tensioning force is selected such that the cable is continuously tensed, even when the connection between the hull structure and the floor structure is subjected to compressive load, due to an acceleration of the aircraft.

Thus, when the connection between the hull structure and the floor structure is subjected to compressive load (acceleration of the aircraft), the cable is weakly tensed, and when the connection between the hull structure and the floor structure is tensioned (deceleration of the aircraft), the cable is heavily tensed.

The pre-tensioning force applied to the cable is therefore the tensile force that is applied to the cable, in the absence of loading of the connection between the hull structure and the floor structure due to an acceleration or a deceleration of the aircraft.

The fact that the cable 21 is permanently tensed prevents it from vibrating, in response to vibrations of the aircraft. If the cable were to vibrate, it would produce an acoustic signal, in the manner of a guitar string. Such a signal would constitute a noise nuisance for the crew members and for the passengers.

Since the natural frequencies of the cable are directly linked to the pre-tension applied thereto, the control of the pre-tension of the cable makes it possible to guarantee a decoupling between the natural modes of the cable and the low frequencies of excitation originating from the surrounding structure (with high energy level and between 0 and 100 Hz).

The floor structure and the hull structure must not be subjected to forces corresponding to an excessively high tension of the cable, otherwise they risk being damaged. In particular, the total tensile force applied to the cable must be less than 3300 N. In order to provide a wide safety margin, it is considered that the pre-tensioning force must be less than 1500 N.

It is also known that the natural frequency of the cable is proportional to the square root of the total tensile force applied thereto.

For example, the natural frequencies have been calculated depending on the total tensile force applied to the cable for three steel cables measuring, respectively, 8 mm, 10 mm and 12 mm in diameter. Knowing the particular aircraft model in question, it is deduced from this that the total tensile force must be between 950 N and 1250 N in order to satisfy the set of conditions above. Taking into account the fact that the cable will also be subject to tensile load or compressive load on account of the accelerations or decelerations of the aircraft, a pre-tensioning force between 1050 and 1150 N, for example approximately 1100 N, is advantageously selected. A pre-tensioning force equal to 1100 N typically corresponds to an elongation of 1.75 mm of the length of the cable, relative to the length thereof at rest, i.e. when it is not subjected to any tensile or compressive stress.

A pre-tensioning force to be applied to the cable can be adjusted, depending on the placement of the cable in the aircraft.

Figure 5:
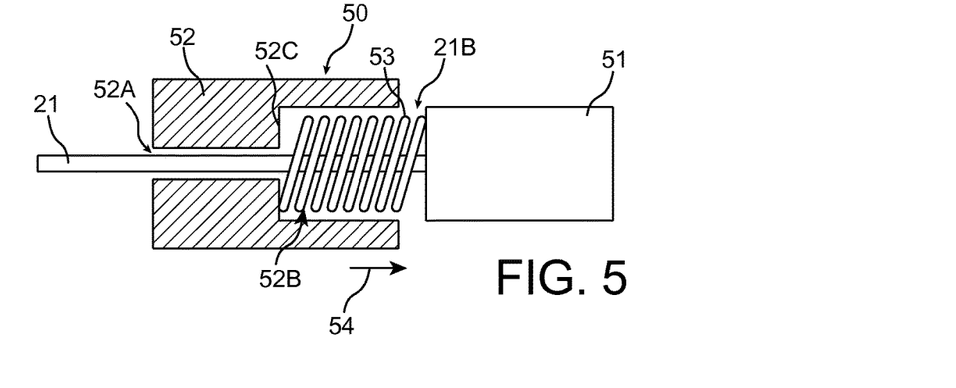
FIG. 5 illustrates a first embodiment of a pre-tensioning device according to the disclosure herein.
Figure 6:
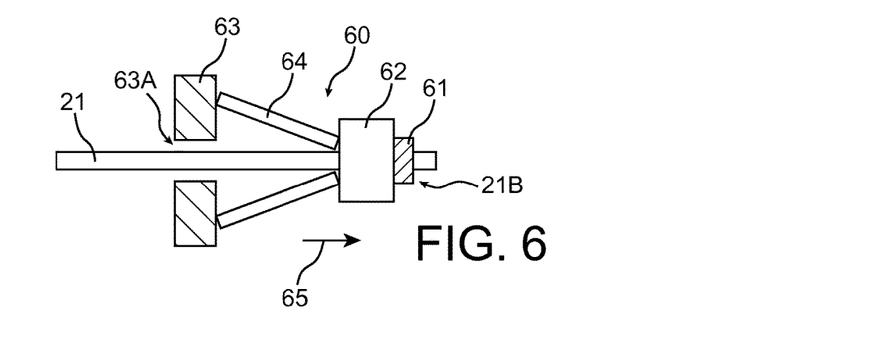
FIG. 6 illustrates a second embodiment of a pre-tensioning device according to the disclosure herein.
Figure 7:
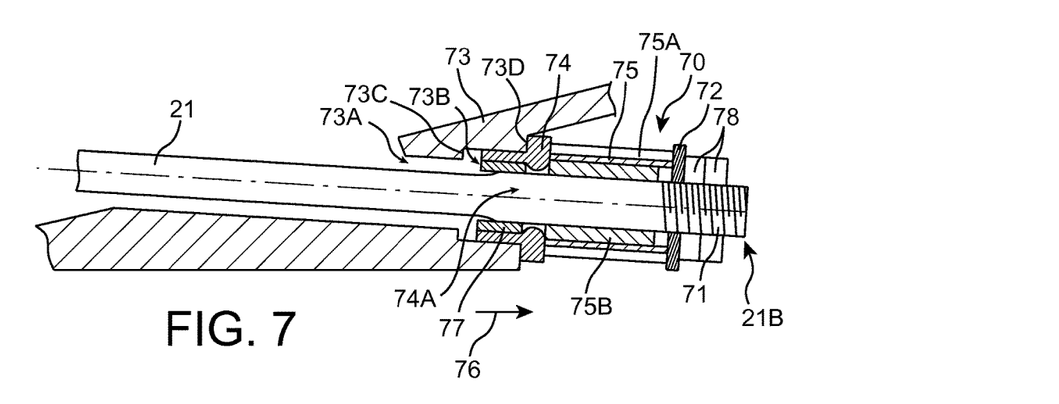
FIG. 7 illustrates a third embodiment of a pre-tensioning device according to the disclosure herein.

FIGS. 5 to 7 show different examples of pre-tensioning devices, designed to apply the pre-tension as defined above, thanks to which the cable is continuously tensioned.

FIG. 5 illustrates a first embodiment of a pre-tensioning device 50.

In accordance with this embodiment, the end of 21B of the cable is housed and fixed in a casing 51, forming a first stop element. The section of the casing 51, in a plane orthogonal to the longitudinal axis of the cable 21, has a surface area greater than that of the section of the cable 21 in such a plane. The longitudinal axis of the cable is defined when this is tensed, between the two fixing points thereof. The fixing of the end 21B of the cable to the casing can be provided as described with reference to FIGS. 4E to 4G.

The cable 21 extends through a guide 52, without being fixed to this guide.

The guide 52 is fixed relative to the floor structure. It can be formed in a portion of the external rail.

In a variant the guide 52 is fixed relative to the hull structure and the end 21A of the cable is of interest.

The guide 52 has an opening 52A, through which the cable 21 extends. The opening 52A has, for example, a circular section in a plane orthogonal to the longitudinal axis of the cable, of diameter slightly greater than the diameter of the cable.

The guide 52 comprises a cavity 52B. The cavity 52B has a cylindrical form, the axis of the cylinder being the same as the longitudinal axis of the cable 21. A face 52C of the cavity receives the opening 52A. The cavity 52B is open on the side of the cylinder opposite the face 52C. The face 52C of the guide forms a second stop element.

A coil spring 53 extends in the cavity 52B, between the casing 51 and the face 52C of the guide. The coils of the spring surround the cable 21. In other words, the coil spring 53 is concentric with the cable 21. The cavity 52B forms a guide for the coil spring 53. The coil spring 53 is a compression spring, bearing on one side against the face 52C of the recess, and on the other side against the casing 51. The coil spring 53 thus exerts a force parallel to the longitudinal axis of the cable (see arrow 54). This force tends to distance the casing 51 receiving the end 21B of the cable from the other end of the cable. This force constitutes a pre-tensioning force as defined hereinbefore.

FIG. 6 illustrates a second embodiment of a pre-tensioning device 60.

In accordance with this embodiment, the end 21B of the cable is provided with a thread, making it possible to fix a screw 61 around the cable 21. A washer 62 is placed around the cable 21 and forms a first stop element.

The pre-tensioning device 60 also comprises a support 63 provided with an opening 63A, through which the cable 21 extends. The cable 21 extends through the support 63, without being fixed to this support.

The support 63 is fixed relative to the floor structure. It can be formed in a portion of the external rail.

In a variant the support 63 is fixed relative to the hull structure, and the end 21A of the cable is of interest.

The opening 63A for example has a circular section in a plane orthogonal to the longitudinal axis of the cable, of diameter slightly greater than the diameter of the cable.

The support 63 forms a second stop element.

A spring washer 64 (also referred to as an elastic washer or Belleville washer) extends between the support 63 and the washer 62. The spring washer 64 is concentric with the cable 21. The spring washer 64 bears on one side against the washer 62, and on the other side against the support 63, in particular a surface of the support facing the washer 62. The spring washer 64 thus exerts a force parallel to the longitudinal axis of the cable (see arrow 65). This force tends to move the washer 62, and with it the screw 61 and the end 21B of the cable, away from the other end of the cable. This force constitutes a pre-tensioning force as defined hereinbefore.

FIG. 7 illustrates a third embodiment of a pre-tensioning device 70.

In accordance with this embodiment, the end 21B of the cable is provided with a thread 71 extending around the cable and over a length of approximately 10 mm. The thread is formed for example in a local excess thickness of the cable 21.

A nut 72 is screwed onto this thread 71. The nut 72 forms a first stop element.

The pre-tensioning device 70 also comprises a support 73 provided with an opening 73A, through which the cable 21 extends. The cable 21 extends through the support 73, without being fixed to this support.

The support 73 is formed for example by a part of the external rail as shown in FIG. 1. Thus, the support 73 is fixed relative to the floor structure.

In a variant the support 73 is fixed relative to the hull structure.

The opening 73A for example has a circular section in a plane orthogonal to the longitudinal axis of the cable, of diameter slightly greater than the diameter of the cable.

The support 73 also comprises a cavity 73B of cylindrical form, the axis of the cylinder being the same as the longitudinal axis of the cable 21 when tensed. A face 73C of the cavity receives the opening 73A. The face 73C is preferably orthogonal to the longitudinal axis of the cable. The cavity 73B is open on the side of the cylindrical cavity opposite the face 73C, on the side of the nut 72. A bushing 74 is inserted with force into the cavity 73B. The cable 21 thus extends also through a central opening 74A of the bushing 74, without being fixed to the bushing. The bushing 74 is a bushing made of bronze, nitrogen shrunk-fit, which makes it possible to protect the support 73, in particular when the support is formed by part of the external rail, made of aluminium. The bushing 74 has a cylindrical portion that fits in the cavity 73B, and has an annular portion which has a greater thickness and which bears against a face 73D of the support 73. The face 73D of the support is preferably parallel to the face 73C. It extends orthogonal to the longitudinal axis of the cable. It is located on the side of the cavity 73B opposite the face 73C, and surrounds the open face of this cavity.

The annular portion of the bushing 74 forms a second stop element. In a variant, the bushing 74 is omitted and it is directly the surface 73D that forms a second stop element.

A spacer 75 is disposed between the bushing 74 and the nut 72. The spacer 75 is concentric with the cable 21 and has an inner diameter slightly greater than the diameter of the cable. Thus, the cable is not fixed relative to the spacer 75. The spacer 75 bears on one side against the nut 72, and on the other side against the bushing 74. The spacer 75 thus exerts a force parallel to the longitudinal axis of the cable (see arrow 76). This force tends to move the nut 72, and with it the end 21B of the cable, away from the other end of the cable. This force constitutes a pre-tensioning force as defined hereinbefore.

By adjusting the position of the nut 72 on the thread 71, the pre-tensioning force exerted thanks to the spacer 75 is adjusted. This embodiment thus has the advantage of allowing a precise, simple and rapid adjustment of the pre-tensioning force. In particular, a dynamometric key can be used to tighten the nut 72, which makes it possible to control the tightening torque of the nut 72 against the spacer 75, and thus the pre-tensioning force exerted due to the spacer.

In the example shown in FIG. 7 the pre-tensioning device also comprises:

- a key 77 for holding the cable 21 in position through the bushing 74;
- a tube 75A for holding the spacer 75 in position between the nut 72 and the bushing 74, the tube 75A extending around the spacer 75 and having a length less than that of the spacer;
- a bushing 75B for holding the spacer 75 in position between the nut 72 and the bushing 74, the bushing 75B extending inside the spacer 75 and around the cable 21 and having a length less than that of the spacer and an inner diameter slightly greater than that of the cable 21; and
- two lock-nuts 78 screwed on the thread 71 of the cable, for securing the positioning of the nut 72. The lock-nuts 78 are connected to the cable 21 by a lock wire, which makes it possible to retain the nuts even if these were to unscrew.

The person skilled in the art will be able to conceive numerous other variants of pre-tensioning devices, without departing from the scope of the present disclosure.

It may be advantageous to preserve anti-crash connecting rods according to the prior art at some points of the fuselage of an aircraft. Nevertheless, three quarters of these anti-crash connecting rods can be replaced each by a respective connecting element according to the disclosure herein. The mass saving for an entire aircraft is thus considerable.

It may also be advantageous to replace a cable 21 with a plurality of parallel cables. Series production of identical cables can thus be implemented. The same cables are then used for all aircraft models, whatever the mass of the floor structure and the mass of that which is to be supported by the floor structure (seats, passengers, luggage, etc.). It is the placement in parallel of a plurality of cables that makes it possible to withstand a forward acceleration of the aircraft of 9 g, whatever the mass subjected to this acceleration.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A part of an aircraft structure comprising:
   - a portion of a floor structure and a portion of a hull structure;
   - a connecting element comprising a flexible cable having a first end fixed to the portion of a floor structure and a second end fixed to the portion of a hull structure; and
   - a pre-tensioning device configured to continuously tension the flexible cable, wherein the pre-tensioning device comprises:

a first stop element protruding on the flexible cable at one of the ends of the flexible cable;

a second stop element, which is mounted fixedly relative to the portion of a floor structure or the portion of a hull structure, and which is provided with an opening through which the flexible cable extends; and a pre-tensioning force element disposed between the first stop element and the second stop element, wherein the portion of a floor structure is connected to the portion of a hull structure by the connecting element, and wherein the flexible cable extends in a plane substantially horizontal to a direction of flight.

2. The part of a structure according to claim 1, wherein the flexible cable is disposed at an angle between the portion of a floor structure and the portion of a hull structure.

3. The part of a structure according to claim 1, wherein the flexible cable is fixed to an external rail of the portion of a floor structure.

4. The part of a structure according to claim 1, wherein the flexible cable is fixed to a frame and a skin of the portion of a hull structure by a coupling part.

5. The part of a structure according to claim 1, wherein the flexible cable has a rigidity less than 1000 N·m$^{-1}$.

6. The part of a structure according to claim 1, wherein the pre-tensioning force element comprises
a compression coil spring mounted concentrically with the flexible cable.

7. The part of a structure according to claim 1, wherein the pre-tensioning force element comprises
a spring washer mounted concentrically with the cable.

8. The part of a structure according to claim 1, wherein the first stop element is screwed around the flexible cable, on a thread of the flexible cable, and wherein the pre-tensioning force element comprises
a spacer, a pre-tensioning force applied to the flexible cable being adjustable by an adjustment of the position of the first stop element on the thread of the flexible cable.

9. The part of a structure according to claim 1, wherein the pre-tensioning device is configured to apply to the flexible cable a pre-tensioning force between 1050 N and 1150 N.

10. The part of a structure according to claim 1, wherein an end of the flexible cable is inserted into an opening formed in an intermediate part fixed to one from the portion of a hull structure and the portion of a floor structure, the flexible cable being secured to the intermediate part by two nuts positioned around the flexible cable on either side of the opening.

11. The part of a structure according to claim 1, wherein an end of the flexible cable is pressed against the base of an indentation in an intermediate part by a clip extending transversely to the cable end, the clip being fixed on either side of the flexible cable to one from the portion of a hull structure and the portion of a floor structure.

12. The part of a structure according to claim 1, wherein an end of the flexible cable is pressed against an inner face of an orifice formed in an intermediate part, by a clip extending transversely to the flexible cable, the clip being fixed on one single side of the flexible cable to one from the portion of a hull structure and the portion of a floor structure.

13. The part of a structure according to claim 1, wherein the flexible cable is formed of metal or composite material.

14. The part of a structure according to claim 1, wherein the second end is located in front of the first end with respect to the direction of flight.

15. An aircraft comprising a plurality of structures according to claim 1.

16. The aircraft according to claim 15, wherein each of the structures is configured so that the second end is located in front of the first end with respect to the direction of flight.

17. The aircraft according to claim 16, wherein each structure is configured to withstand a 9 g deceleration of the aircraft.

* * * * *